July 6, 1954   R. HILFINGER   2,683,056
TRAVELING LAWN SPRINKLER
Filed April 30, 1953   4 Sheets-Sheet 1

Inventor
Robert Hilfinger
By Owen & Owen
Attorney

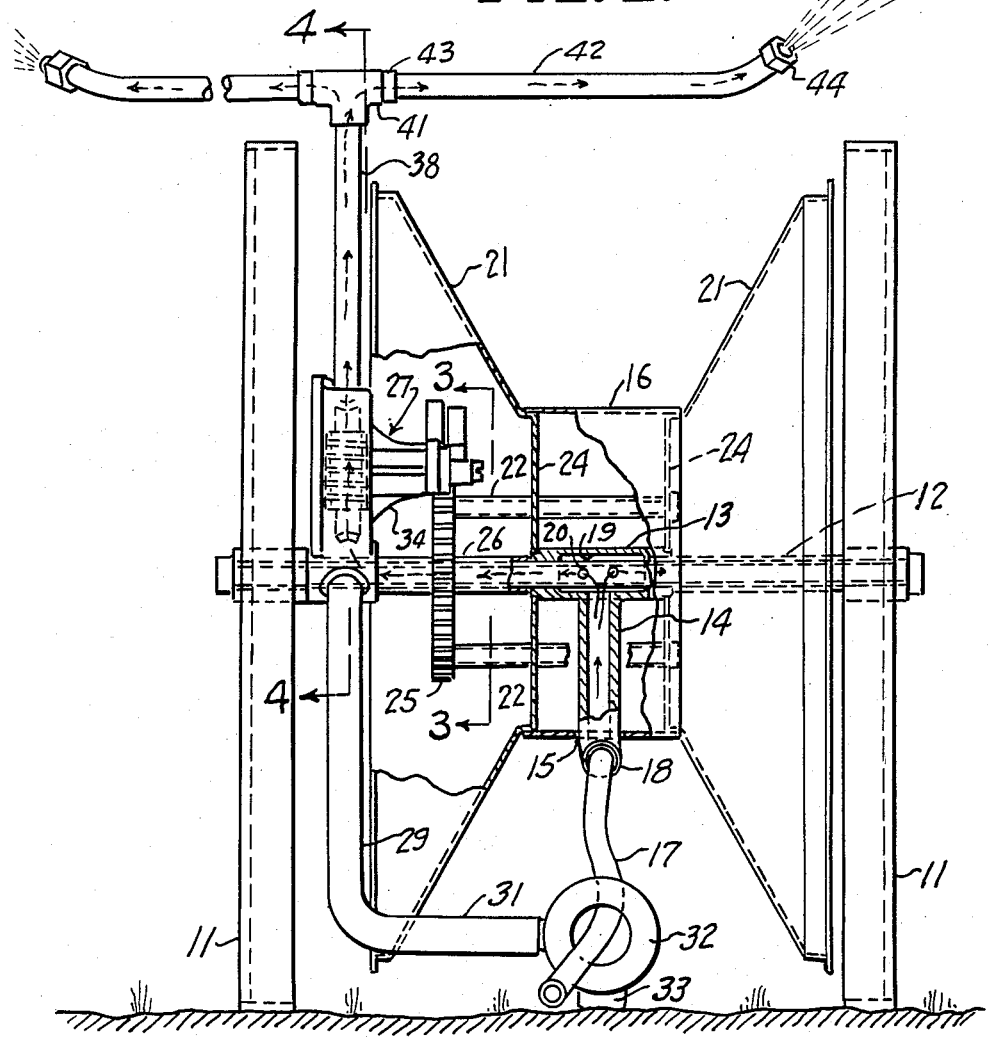

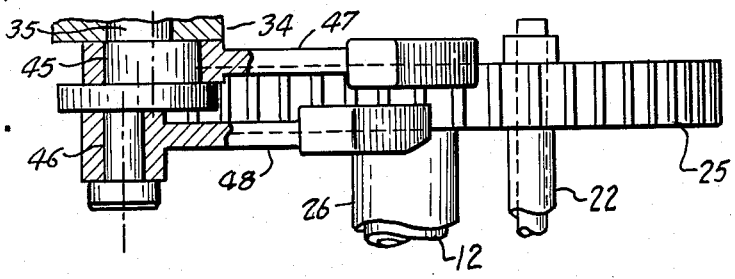
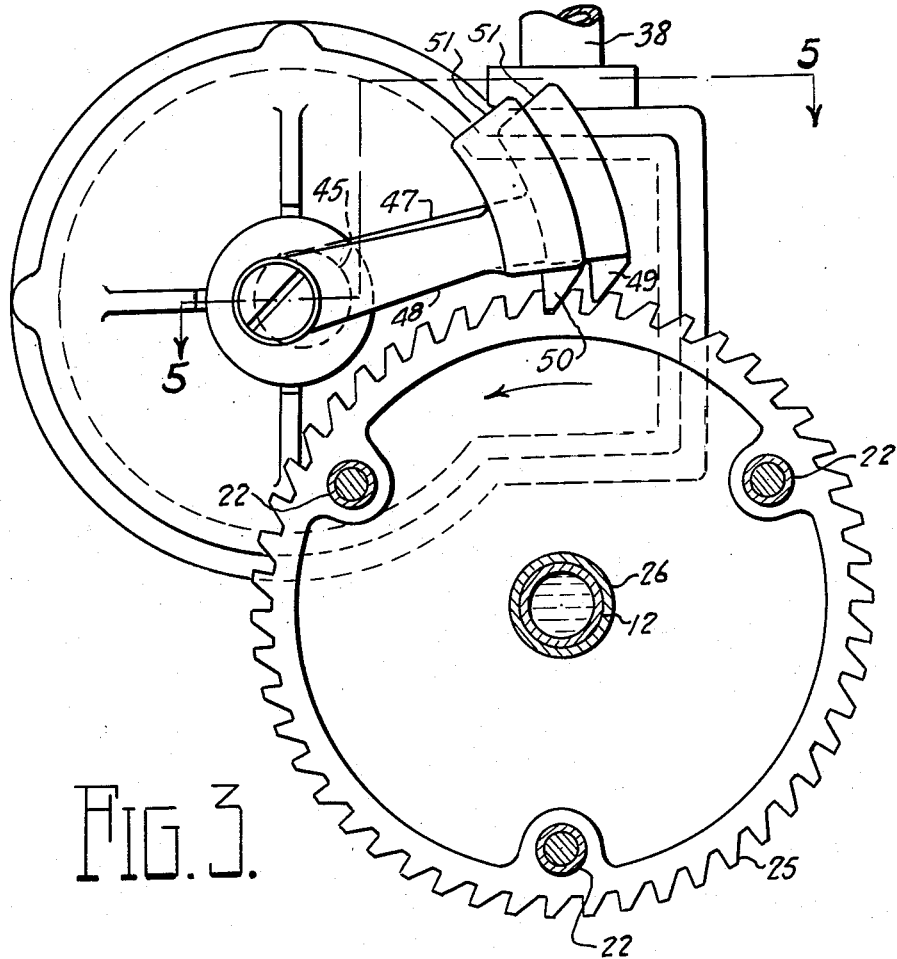

July 6, 1954  R. HILFINGER  2,683,056
TRAVELING LAWN SPRINKLER
Filed April 30, 1953  4 Sheets-Sheet 4
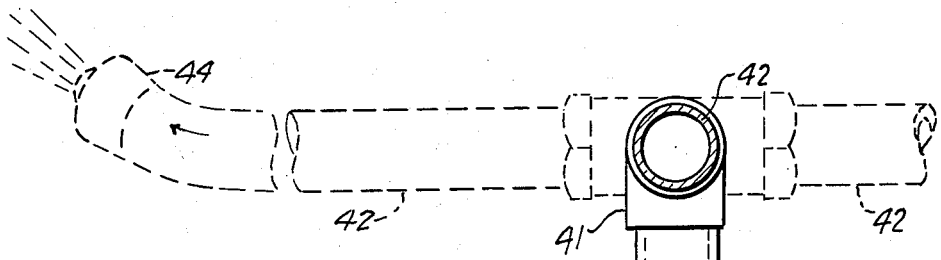
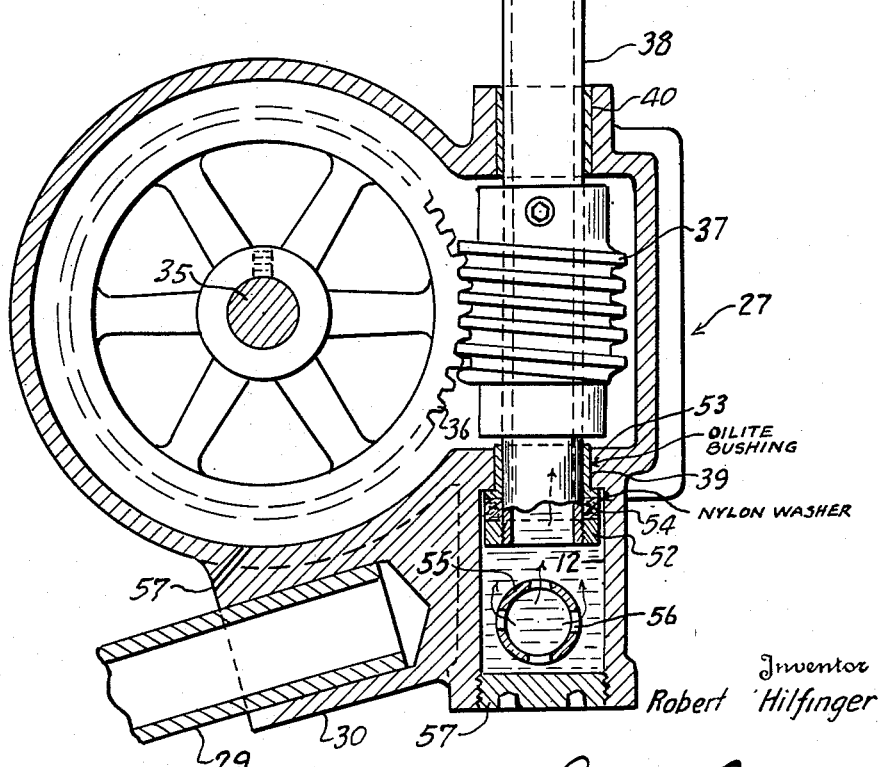
Fig 4
Inventor
Robert Hilfinger
By Owen + Owen
Attorney Patented July 6, 1954

2,683,056

UNITED STATES PATENT OFFICE 2,683,056

TRAVELING LAWN SPRINKLER

Robert Hilfinger, Waterville, Ohio

Application April 30, 1953, Serial No. 352,132

3 Claims. (Cl. 299—50)

This invention relates to traveling lawn sprinklers and, more particularly, to a traveling lawn sprinkler which provides a reel upon which a considerable length of hose may be wound and stored when not in use, which can be used as a cart to carry the hose from place to place and to lay out the hose in a selected pattern over the lawn or other area to be sprinkled, which is driven by reaction to the pressure of the water being sprinkled and which will travel along the hose in the path defined by the hose so that the area over which the sprinkler moves can be predetermined and it will complete a circuit without further attention.

The object of this invention particularly is to provide for the relatively fool-proof and simple construction of such a sprinkler and a motive power mechanism which is simple to disengage when the device is to be employed as a hose carrying reel and yet effective for driving the structure to cause it to follow the hose and thus to travel as the sprinkler spreads water over the area being sprinkled.

In the drawings:

Fig. 2 is an enlarged front elevation with parts being shown in section and parts being broken away to indicate both the connections for the water and the construction of portions of the device.

Fig. 3 is a greatly enlarged fragmentary vertical sectional view taken on the line 3—3 of Fig. 2.

Fig. 4 is a similar view taken on the line 4—4 of Fig. 2.

Fig. 5 is a fragmentary horizontal sectional view taken on the line 5—5 of Fig. 3.

Figure 1:
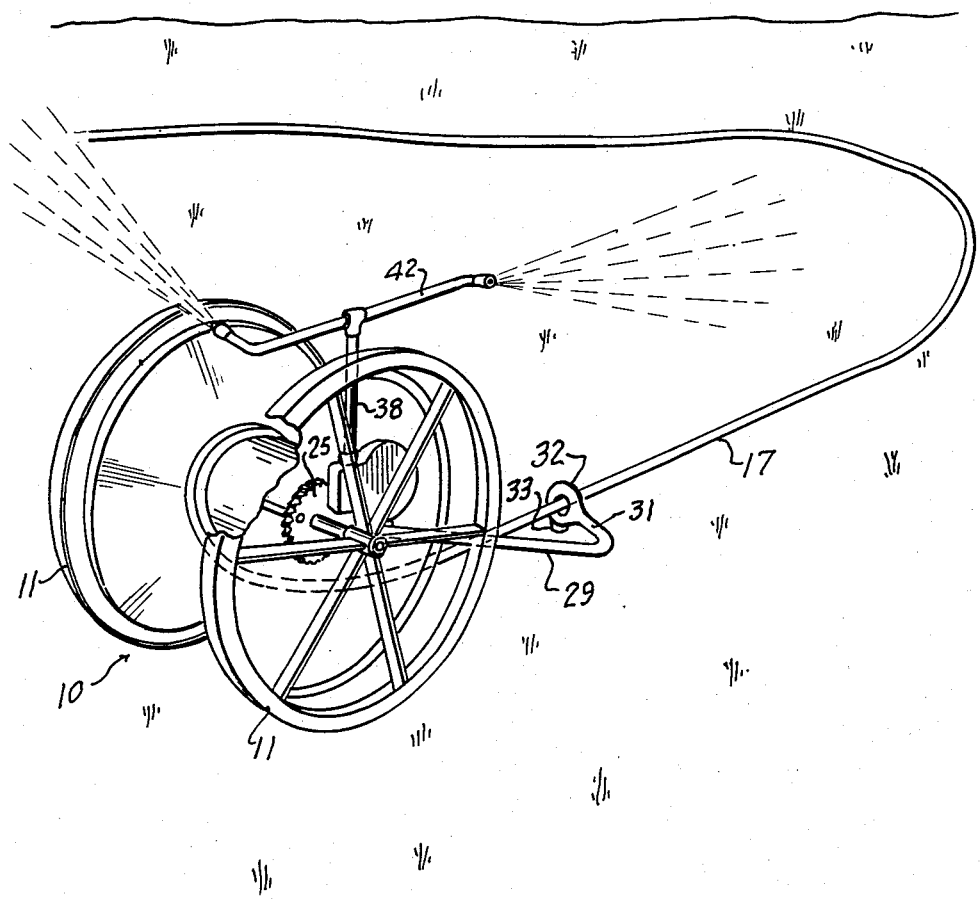
Fig. 1 is a view in perspective of an automatic traveling sprinkler embodying the invention with a section of hose being shown as determining the path over which the sprinkler is to be traversed.

In the embodiment of the invention illustrated in the drawings a traveling sprinkler generally indicated at 10 has a pair of large diameter wheels 11 which are rotatably mounted upon a main horizontal axle 12. The axle 12 is hollow and extends through the cross bar of a T-shaped casting 13, the ends of the casting 13 being packed around the axle 12. The casting 13 has a pipe-like arm 14 which is shown in Fig. 2 as extending downwardly through an opening 15 in the periphery of a cylindrical drum 16 on which a length of hose 17 may be wound in operation of the device. At the lower end of the pipe 14 a standard coupling 18 is provided for connecting the hose 17.

The casting 13 has a centrally located bore 19 larger in diameter than the diameter of the hollow axle 12 and the axle 12 has several drilled holes 20 which open into the bore 19.

A pair of formed cones 21 are supported by three tie rods 22 (see also Fig. 3) which extend through flat hub portions 24 of the cones 21, parallel to and radially spaced around the axle 12. The tie rods 22 also are securely fastened to a ratchet gear 25 which is mounted upon the axle 12 coaxially therewith by a sleeve 26.

The casting 13 and its arm 14, the two cones 21, the tie rods 22 and ratchet gear 25 all rotate on the axle 12.

A gear box generally indicated at 27 is pressed on the axle 12 (Fig. 4) so that the gear box 27 and the axle 12 can remain stationary when the associated parts 13, 14, 21, 22 and 25 rotate. The gear box 27 is held in its stationary position by an arm 29 which is secured in a boss 30 (Fig. 4) of the box 27 and extends downwardly and forwardly having a turned over end 31 provided with a hose guide eye 32. The hose 17 extends through the eye 32 and the eye 32 has a skid 33 which slides over the surface of the ground as the device moves along. The arm 29 is of such weight and length that it always remains in contact with the surface of the ground to maintain the gear box 27 in its upper position and to prevent its turning over on the axis provided by the axle 12 during operation of the sprinkler.

The gear box 27 has an axially protruding boss 34 which extends inwardly toward the ratchet gear 25 and is bored to journal a short shaft 35 (Figs. 4 and 5). The shaft 35 mounts a worm gear 36 (Fig. 4) which is meshed with a worm 37 that is secured on a vertically extending hollow shaft 38. The shaft 38 is journalled in a flanged bushing 39 near the lower end of the gear box 27 and extends upwardly out through a bushing 40 aligned with the bushing 39. The shaft 38 extends upwardly beyond the rim of the adjacent one of the wheels 11 and, at its upper end, is provided with a T fitting 41 the two arms of which mount a pair of sprinkler arms 42 threaded thereinto and provided with lock nuts 43 and sprinkler heads 44. The sprinkler heads 44 (Figs. 1, 2 and 4) are turned upwardly and outwardly so that jets of water emanating therefrom are thrown upwardly and outwardly away from the sprinkler and the reaction to their jetting causes the arms 42 to revolve, rotating the shaft 38 as indicated by the arrow in Fig. 4.

Rotation of the shaft 38 rotates the worm 37 which in turn rotates the worm gear 36 that is fixed on the short shaft 35 which protrudes from the elongated boss 34 of the gear box 27.

At the inner end of the shaft 35 (i. e., that end extending toward and overlying the ratchet gear 25) there are a pair of eccentric portions 45 and 46 (Figs. 3 and 5) which serve as cranks for a pair of weighted pawls 47 and 48 respectively. Each of the pawls 47 and 48 has a downwardly extending finger 49 or 50 which is engageable with the teeth in the ratchet gear 25 and a weighted head 51 which holds the pawls 47 and 48 downwardly in engagement with the ratchet gear 25.

Rotation of the shaft 35 rotates the eccentrics 45 and 46 as cranks and moves the pawls 47 and 48 accordingly first to slide their fingers 49 and 50 in a clockwise direction (Fig. 3) ratcheting over one tooth in the ratchet gear 25 and then to engage the fingers 49 or 50 back of a tooth in the gear 25 and to pull the gear 25 in a counterclockwise direction (Fig. 3). It will be observed in Fig. 3 that the pawl 48 has substantially completed its movement to the left pulling the ratchet gear 25 counterclockwise and the pawl 47 is about to engage its fingers 49 back of the next adjacent tooth (in a clockwise direction) on the gear 25 to pull the gear 25 further in a counterclockwise direction. Thus the pawls 47 and 48 engage their fingers 49 and 50 respectively behind alternate ones of the teeth in the gear 25 in a "hand over hand" action, constantly pulling upon the gear 25 to rotate the gear 25 and, through the tie rods 22, the cones 21, drum 16 and casting 13 and its arm 14, to wind the hose 17 upon the drum 16.

Winding the hose 17 upon the drum 16 by swinging the arm 14 of the casting 13 around the axle 12 would either draw the hose 17 onto the drum 16 or it will cause the travelling sprinkler 10 as a whole to be pulled along the hose 17, running along the surface of the ground or lawn upon its wheels 11. Since the travelling sprinkler is much lighter in weight and more free to move by reason of its large diameter wheels 11 than is the substantial length of hose 17 that lies on the ground and is secured to a spigot at its other end, rotation of the casting arm 14 winds the hose 17 upon the drum 16 and carries the sprinkler 10 along the ground following the path laid out by the hose 17.

The lowermost end of the shaft 38 which is journalled in the flanged bushing 39 has a fixed collar 52 (Fig. 4) which is spaced from the underside of a web 53 in the casting forming the gear box 27 in which the flanged bushing 39 is mounted. A sealing washer 54 is located between the upper surface of the collar 52 and the lower surface of the flange on the bushing 39 to act as an antifriction bearing between these two surfaces and to act as a seal for preventing water from passing upwardly between the bushing 39 and the outside of the hollow shaft 38 into the gear box 27 when the device is in operation.

The sealing washer 54 preferably is fabricated from a plastic material having a low coefficient of friction with the material from which the flanged bushing 39 is formed and with the material from which the collar 52 is fabricated. In practice, using a bushing 39 made from oil impregnated material such as "Oilite," the washer 54 is most effective when molded from a polyamide resin, particularly nylon.

The lower end of the shaft 38 with its collar 53 and washer 54 extends into a pocket 55 in the casting forming the gear box 27 through which the hollow axle 12 also extends and the hollow axle 12 is drilled with small holes 56 located within the pocket 55 to allow water to flow from the axle 12 into the pocket 55 and then into the vertically extending hollow shaft 38. The pocket 55 is closed by a threaded plug 57.

After a device embodying the invention has been moved out to the end of its hose 17 and it is ready to initiate a sprinkling cycle, the gardener turns on the water at the spigot to which the hose 17 is connected. Water flows through the hose 17 and into the arm 14 of the casting 13, through the coupling 18 and into the bore 19 of the casting 13. It then flows through the holes 20 into the interior of the hollow axle 12, along the axle 12 and out the holes 56 (Fig. 6) into the pocket 55. The pressure of the water entering the pocket 55 thrusts upwardly on the collar 52 forcing it up against the washer 54 and the washer 54 in turn against the lower surface of the flanged bushing 39. Only a drop or two of water escapes from the pocket 55 around the shaft 38 or bushing 39 and into the gear box 27 before the pressure has thus thrust the sealing and antifriction washer into the position just described. Any such drops of water which do flow into the gear box 27 are carried by gravity downwardly to a drain hole 57 where they run out. As long as the water pressure is turned on, the collar 52 and washer 54 are thrust upwardly preventing leaks around the shaft 38 and the water flows up the shaft 38 to the T fitting 41 and then out the arms 42 to the nozzles 44 where it is sprayed over a circular area that progresses along the path defined by the hose 17 as the device operates.

Having described the invention, I claim:

1. In a reel type sprinkler having a hose reel, in combination, a pair of ground wheels of diameter larger than the diameter of said hose reel and mounted co-axially therewith for free rotation relative thereto, a frame, a sprinkler head, gearing driven thereby for rotating said reel relative to said frame, a forwardly extending ground contacting arm on said frame, and an eye on the forward end of said arm through which the hose passes en route to said reel, whereby force in reaction to the hose reeling force which tends to overturn said sprinkler around the axis of said reel is overcome by the weight of said hose engaged in said eye.

2. A reel type sprinkler comprising a horizontal axle, a hose reel rotatably mounted on said axle, a pair of ground wheels of diameter larger than said hose reel, said ground wheels being rotatably mounted on the ends of said axle, a gear housing non-rotatably mounted on said axle, a sprinkler head mounted in said housing for rotation, gearing in said housing driven by said sprinkler head for rotating said reel for winding a hose thereon, a forwardly extending arm on said frame and an eye on the forward end of said arm through which the hose passes en route to said reel, whereby force in reaction to the hose reeling force which tends to overturn said sprinkler around the axis of said reel is overcome by the weight of said hose engaged in said eye.

3. A sprinkler according to claim 2 in which said axle is hollow and there is a hose coupling near the center thereof for connecting the hose thereto and said axle is in communication with said sprinkler head through said gear housing.

References Cited in the file of this patent

UNITED STATES PATENTS

| Number | Name | Date |
|---|---|---|
| 2,152,425 | Wilson | Mar. 28, 1939 |
| 2,218,964 | Wilson | Oct. 22, 1940 |
| 2,493,528 | Crowder | Jan. 3, 1950 |
| 2,602,696 | Salatin | July 8, 1952 |

FOREIGN PATENTS

| Number | Country | Date |
|---|---|---|
| 620,459 | Great Britain | Mar. 24, 1949 |